United States Patent [19]

Hannie

[11] E Re. 29,942

[45] Reissued Mar. 20, 1979

[54] PROCESSING COMPOSITIONS FOR COLOR TRANSFER PROCESSES COMPRISING ALKALI METAL FLUORIDES

[75] Inventor: David E. Hannie, Pittsford, N.Y.

[73] Assignee: Eastman Kodak Company, Rochester, N.Y.

[21] Appl. No.: 901,969

[22] Filed: May 1, 1978

Related U.S. Patent Documents

Reissue of:

[64] Patent No.: 4,028,103
Issued: Jun. 7, 1977
Appl. No.: 675,661
Filed: Apr. 12, 1976

[51] Int. Cl.[2] ..... G03C 7/00; G03C 5/54; G03C 5/30; G03C 1/40

[52] U.S. Cl. ..... 96/29 D; 96/3; 96/66 R; 96/66.4; 96/73; 96/76 C; 96/77

[58] Field of Search ..... 96/3, 29 D, 73, 76 C, 96/77, 66 R, 66.4

[56] References Cited

U.S. PATENT DOCUMENTS

| | | | |
|---|---|---|---|
| B 351,673 | 1/1975 | Fleckenstein et al. | 96/29 D |
| 2,543,181 | 2/1951 | Land | 96/29 D |
| 2,697,036 | 12/1954 | Higgins et al. | 96/74 |
| 2,706,157 | 4/1955 | Sainsbury et al. | 96/108 |
| 2,983,606 | 5/1961 | Rogers | 96/3 |
| 3,260,598 | 7/1966 | Yutzy et al. | 96/76 R |
| 3,351,465 | 11/1967 | Mendelsohn | 96/29 D |
| 3,362,819 | 1/1968 | Land | 96/77 |
| 3,362,821 | 1/1968 | Land | 96/77 |
| 3,415,644 | 1/1968 | Land | 96/77 |
| 3,415,645 | 1/1968 | Land | 96/77 |
| 3,415,646 | 1/1968 | Land | 96/77 |
| 3,635,707 | 1/1972 | Cole | 96/76 C |
| 3,706,561 | 12/1972 | Mowrey et al. | 96/60 BF |
| 3,756,815 | 9/1973 | Schlein et al. | 96/77 |
| 3,811,888 | 5/1974 | Shibaoka et al. | 96/66.4 |

FOREIGN PATENT DOCUMENTS

| | | |
|---|---|---|
| 674082 | 6/1963 | Canada. |
| 928559 | 6/1973 | Canada. |
| 1330524 | 9/1973 | United Kingdom. |

OTHER PUBLICATIONS

"Additions to Diffusion Transfer Developing Compositions," *Research Disclosure* No. 11420, 10/1973 p. 21.

*Primary Examiner*—Richard L. Schilling
*Attorney, Agent, or Firm*—Harold E. Cole

[57] ABSTRACT

Improvements in the physical characteristics of a photographic assemblage, especially an integral transfer element, are obtained by employing an alkali metal salt in the alkaline processing composition used to process the assemblage. The anion of the salt has a solubility in relation to that of sulfate such that after processing in the presence of calcium and sulfate ions, calcium will combine with said anion in preference to sulfate at any given pH. Especially preferred salts are alkali metal fluorides or oxalates.

14 Claims, No Drawings

PROCESSING COMPOSITIONS FOR COLOR TRANSFER PROCESSES COMPRISING ALKALI METAL FLUORIDES

Matter enclosed in heavy brackets [ ] appears in the original patent but forms no part of this reissue specification; matter printed in italics indicates the additions made by reissue.

This invention relates to photography, and more particularly to photographic assemblages for color diffusion transfer photography wherein the processing composition contains an alkali metal salt which will prevent certain large crystal impurities from being formed.

Various formats for color integral transfer elements are described in the prior art, such as U.S. Pat. Nos. 3,415,644; 3,415,645; 3,647,437; 3,635,707; 3,756,815 and Canadian Pat. Nos. 928,559 and 674,082. In these formats, the image-receiving layer containing the photographic image for viewing can remain permanently attached and integral with the image generating and ancillary layers present in the structure when a transparent support is employed on the viewing side of the assemblage. The image is formed by dyes, produced in the image generating units, diffusing through the layers of the structure to the dye image-receiving layer. After exposure of the assemblage, an alkaline processing composition permeates the various layers to initiate development of the exposed photosensitive silver halide emulsion layer. The emulsion layers are developed in proportion to the extent of the respective exposures, and the image dyes which are formed or released in the respective image generating layers begin to diffuse throughout the structure. At least a portion of the imagewise distribution of diffusible dyes diffuse to the dye image-receiving layer to form an image of the original subject.

Other so-called "peel-apart" formats for color diffusion transfer assemblages are described, for example, in U.S. Pat. Nos. 2,983,606; 3,362,819; and 3,363,821. In these formats, the image-receiving element is separated from the photosensitive element after the development and transfer of the dyes to the image-receiving layer.

A problem has been observed in connection with such transfer elements which is particularly troublesome in connection with integral transfer elements. After processing, an integral transfer element may not dry out for an extended period of time, e.g., up to about 30 days. The reason it takes so long to dry is that the solvent, usually water, from the processing composition evaporates very slowly from the assemblage, either through the edges of the assemblage or through the exposing and viewing surface of the assemblage which are generally made out of a relatively water vapor-impervious material such as poly(ethylene terephthalate). During the time while the assemblage is wet, inorganic salt crystals can form and slowly in size. In particular, if calcium and sulfate ions are present in such an assemblage, e.g., as impurities from the gelatin, carbon layer, supports, alkaline processing composition, etc., then large crystals of a complex salt comprising mostly calcium sulfate can eventually form. These crystals are not present immediately after processing but begin to form and grow as the assemblage dries out. Once the crystals form and the assemblage becomes thinner on drying, physical defects or irregularities become visible to the naked eye on either side of the assemblage. The defects take the form of small specks or protrusions which are randomly distributed across the entire image area. I have found that this problem can be substantially eliminated by the use of my invention.

A photographic assemblage according to my invention comprises:

a. a support having thereon at least one photosensitive silver halide emulsion layer having associated therewith a dye image-providing material;

b. a dye image-receiving layer; and c. an alkaline processing composition having a pH of at least about 11 and means for discharging same within the assemblage; the assemblage containing a silver halide developing agent, and wherein the alkaline composition contains an alkali metal salt, the anion of which has a solubility in relation to that of sulfate such that, after processing of said assemblage in the presence of calcium and sulfate ions, calcium will combine with the anion in preference to the sulfate at a given pH. Mixtures of such salts are also useful.

The alkali metal salt, per se, may be added directly with the other components to make up the alkaline processing composition. Alternatively, it may be formed in situ, such as by adding the anion to the processing composition in the form of an acid, ester, or alkyl fluoride, which, in the presence of excess base, e.g., KOH, produces said alkali metal salt in said processing composition.

Although the mechanism of the present invention is not known, it is believed that the anion of the salt preferentially combines with the calcium present in the processing composition to prevent the formation of calcium sulfate. The particular anion to be used in a given situation depends on the quantities of the impurities present, the final pH of the assemblage, and a subjective determination that the crystaline impurities which do form are, or are not, objectionable from a visual standpoint. For example, at pH 9.0, calcium carbonate salt will form in preference to calcium sulfate because of their relative solubilities. However, since calcium carbonate becomes soluble for all practical purposes below pH 6.0, calcium sulfate would form in preference to calcium carbonate below about pH 6.3. Thus, if the final pH of the assemblage is above 6.3, then an alkali metal carbonate will be useful. If the final pH of the assemblage is lower than that, however, then some other anion may be more suitable. In a similar manner, an alkali metal phosphate may be useful if the final pH of the assemblage is above 5.3.

Since another crystal, other than calcium sulfate, is being formed, the suitability of a particular anion is determined by whether or not this other crystal is objectionable. In general, this other crystal or precipitate which forms should remain small in size, relatively speaking, and not ripen into large, objectionable crystals such as those of calcium sulfate which would cause obserable defects in the final dye image-receiving layer.

I have found that particularly good results are obtained with alkali metal fluorides or oxalates. The final pH of a preferred assemblage described hereinafter is about 4.5. At that pH, the calcium fluoride or oxalate precipitate which forms (in preference to calcium sulfate) remains very small in size and does not produce any specks which are visible to the naked eye, and therefore objectionable, in the image-receiving layer.

The alkali metal of the alkali metal salt employed in my invention are those found in the first group in the periodic table: lithium, sodium, potassium, rubidium and cesium. Particularly good results have been obtained with potassium salts.

The alkali metal salt may be employed in my invention in any concentration effective for the intended purpose. In general, the processing composition will contain the salt at a concentration of about 0.01 N to about 0.5 N, preferably 0.05 N to 0.2 N.

Various fluoride salts have have been used in various photographic processes such as those described in U.S. Pat. Nos. 2,697,036; 2,706,157; 3,351,465; and 3,706,561. Potassium fluoride has also been incidentally disclosed for use in relatively low pH activator solutions for diffusion transfer elements, as described in U.S. Pat. No. 3,260,598. In none of these patents, however, have such salts been employed in the manner than I use them, nor have they solved the problem I have solved according to my invention.

One embodiment of an assemblage of an integral transfer color element and a process for producing a photographic transfer image in color in which my invention can be employed is disclosed in Canadian Pat. No. 928,559. In this embodiment, the support for the photosensitive element is transparent and is coated with an image-receiving layer, a light-reflective layer, an opaque layer and photosensitive layers, having associated therewith dye image-providing material layers. A rupturable container containing the alkaline processing composition described above and an opacifier such as carbon black is positioned adjacent the top layer and a transparent cover sheet. The cover sheet comprises a transparent support which is coated with a neutralizing layer and a timing layer. The film unit is placed in a camera, exposed through the transparent cover sheet and then passed through a pair of pressure-applying members in the camera as it is being removed therefrom. The pressure-applying members rupture the container and spread processing composition and opacifier over the image-forming portion of the assemblage to protect it from exposure. The processing composition develops each silver halide layer and dye images are formed as a result of development which diffuse to the image-receiving layer to provide a right-reading image which is viewed through the transparent support on the opaque reflecting layer background. For further details concerning the format of this particular integral assemblage, reference is made to the above-mentioned Canadian Pat. No. 928,559, which is incorporated herein by reference.

Another embodiment of an assemblage of an integral transfer color element and a process for producing a photographic transfer image in color in which my invention can be employed is described in U.S. Pat. No. 3,415,644. In this embodiment, the negative comprises an opaque support which is coated with photosensitive layers having associated therewith dye image-providing material layers. A rupturable container containing the alkaline processing composition described above, $TiO_2$ and an indicator dye (see U.S. Pat. No. 3,647,437) is positioned adjacent the top layer and a transparent receiver. The receiver comprises a transparent support which is coated with a neutralizing layer, a timing layer and an image-receiving layer. The film unit is placed in a camera, exposed through the transparent receiver and then passed through a pair of pressure-applying members in the camera as it is being removed therefrom. The pressure-applying members rupture the container and spread processing composition, $TiO_2$ and indicator dye over the image-forming portion of the assemblage to protect it from exposure. The processing composition develops each silver halide layer and dye images are formed as a result of development which diffuse to the image-receiving layer which is viewed through the transparent support on a white background — the indicator dye having "shifted" to a colorless form as the alkali is consumed by the neutralizing layer. For further details concerning the format of this particular assemblage, reference is made to the abovementioned U.S. Pat. No. 3,415,644, which is incorporated herein by reference. Since the image in this embodiment is geometrically reversed, an image-reversing optical system such as a mirror in the camera is needed to reverse the image so that a right-reading image is viewable in the dye image-receiving layer.

Still other useful formats in which my invention can be employed are described in U.S. Pat. Nos. 3,362,819; 3,415,645; 3,415,646; 2,983,606; 2,543,181; 3,647,437; 3,635,707; British Pat. No. 1,330,524; and Canadian Pat. No. 674,082; the disclosures of which are hereby incorporated by reference.

The photosensitive element useful in my invention can be treated with an alkaline processing composition to effect or initiate development in any manner. A preferred method for applying processing composition is by use of a rupturable container or pod which contains the composition. In general, the processing composition employed in my invention will also contain the developing agent for development. Where the developer is incorporated in the photosensitive element, the alkaline processing composition serves to activate the incorporated developer.

The dye image-providing materials which may be employed in my invention generally way be characterized as either (1) initially soluble of diffusible in the processing composition but are selectively rendered nondiffusible in an imagewise pattern as a function of development, such as those disclosed, for example, in U.S. Pat. Nos. 2,647,049; 2,661,293; 2,698,244; 2,698,798; 2,802,735; 2,774,668; and 2,983,606; or (2) initially insoluble or nondiffusible in the processing composition but which are selectively rendered diffusible in an imagewise pattern as a function of development, such as those disclosed, for example, in U.S. Pat. Nos. 3,227,550; 3,227,551; 3,227,552; 3,227,554; 3,243,294; and 3,445,228. These materials may be preformed dyes or dye precursors, e.g., color couplers, oxichromic compounds and the like.

In a preferred embodiment of my invention, the dye image-providing material is a nondiffusible or ballasted dye releaser. Such compounds are, generally speaking, compounds which can be oxidized by oxidized developing agent, i.e., cross-oxidized, to provide a species which as a function of oxidation will release a diffusible dye, such as by alkaline hydrolysis. Such dye releasers are described in U.S. Pat. Nos. 3,725,062 of Anderson and Lum issued Apr. 3, 1973, 3,698,897 of Gompf and Lum issued Oct. 17, 1972, 3,628,952 of Puschel et al issued Dec. 21, 1971, 3,443,939 and 3,443,940 of Bloom et al issued May 13, 1969, 3,928,312 of Fleckenstein issued Dec. 23, 1973, 3,929,760 of Landholm et al issued Dec. 20, 1975, 3,929,760 of Landholm et al issued Mar. 9, 1976, 3,932,380 of Krutak et al issued Jan. 13, 1976, and U.S. Published Patent Application trial Voluntary Protest No. B-351,673 of Fleckenstein et al published Jan. 28, 1975, U.S. Ser. Nos. 583,940 of Fleckenstein filed June 5, 1975, now U.S. Pat. No. 3,993,638, 439,809 of Drutak et al filed Feb. 5, 1974 now U.S. Pat. No. 3,954,476, 503,144 of Fleckenstein et al filed Sept. 4, 1974, 590,899 of Haase et al filed June 27, 1975, 534,966 of Hinshaw et al filed Dec. 20, 1974, 589,977 of Hinshaw et al filed June 24, 1975, and 511,568 of Fields et al filed Oct. 20, 1974 now U.S. Pat. No. 3,980,479, and German OLS 2,406,664, the disclosures of which are hereby incorporated by reference.

In an especially preferred embodiment of my invention, the dye releasers such as those in the Fleckenstein et al patents and applications referred to above are employed. Such compounds are ballasted sulfonamido compounds which are alkali-cleavable upon oxidation to release a diffusible dye from the nucleus and have the formula:

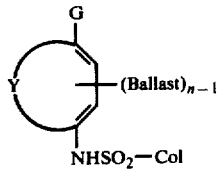

wherein:

a. Col is a dye or dye precursor moiety;

b. Ballast is an organic ballasting radical or such molecular size and configuration (e.g., simple organic groups or polymeric groups) as to render the compound nondiffusible in the photosensitive element during development in an alkaline processing composition at a pH of at least about 11; G is OR or $NHR_1$ wherein R is hydrogen or a hydrolyzable moiety and $R_1$ is hydrogen or a substituted or unsubstituted alkyl group of 1 to 22 carbon atoms, such as methyl, ethyl, hydroxyethyl, propyl, butyl, secondary butyl, tert-butyl, cyclopropyl, 4-chlorobutyl, cyclobutyl, 4-nitroamyl, hexyl, cyclohexyl, octyl, decyl, octadecyl, docosyl, benzyl, phenethyl, etc., (when $R_1$ is an alkyl group or greater than 6 carbon atoms, it can serve as a partial or sole Ballast group);

d. Y represents the atoms necessary to complete a benzene nucleus, a naphthalene nucleus, or a 5–7 membered heterocyclic ring such as pyrazolone, pyrimidine, etc; and e. n is a positive integer of 1 or 2 and is 2 when G is OR or when $R_1$ is a hydrogen or an alkyl group or less than 8 carbon atoms.

For further details concerning the above-described sulfonamido compounds and specific examples of same, reference is made to the above-mentioned Fleckenstein et al patents and applications referred to above.

In another embodiment of my invention, initially diffusible dye image-providing materials are employed such as dye developers, including metal complete dye developers such as those described in U.S. Pat. Nos. 3,453,107; 3,544,545; 3,551,406; 3,563,739; 3,597,200; 3,705,184; and oxichromic developers as described and claimed in U.S. Pat. Nos. 3,880,658; 3,854,945; and 3,791,827; the disclosure of which are hereby incorporated by reference. When oxichromic developers are employed, the image is formed by the diffusion of the oxichromic developer to the dye image-receiving layer where it undergoes chromogenic oxidation to form an image dye.

The assemblage of the present invention may be used to produce positive images in single- or multicolors. In a three-color system, each silver halide emulsion layer of the film assembly will have associated therewith a dye image-providing material possessing a predominant spectral adsorption within the region of the visible spectrum to which said silver halide emulsion is sensitive, i.e., the blue-sensitive silver halide emulsion layer will have a yellow dye image-providing material associated therewith, the green-sensitive silver halide emulsion layer will have a magenta dye image-providing material associated therewith, and the red-sensitive silver halide emulsion layer will have a cyan dye image-providing material associated therewith. The dye image-providing material associated with each silver halide emulsion layer may be contained either in the silver halide emulsion layer itself or in a layer contiguous to the silver halide emulsion layer.

The concentration of the dye image-providing materials that are employed in the present invention may be varied over a wide range depending upon the particular compound employed and the results which are desired. For example, the dye image-providing compounds may be coated as dispersions in layers by using coating solutions containing a ratio between about 0.25 and about 4 of the dye image-providing compound to the hydrophilic film-forming natural material or synthetic polymer binder, such as gelatin, polyvinyl alcohol, etc., which is adapted to be permeated by aqueous alkaline processing composition.

Any silver halide developing agent can be employed in my invention depending upon the particular chemistry system involved. The developer may be employed in the photosensitive element to be activated by the alkaline processing composition. Specific examples of developers which can be employed in my invention include:

hydroquinone
N-methylaminophenyl
Phenidone (1-phenyl-3-pyrazolidinone)
Dimezone (1-phenyl-4,4-dimethyl-3-pyrazolidinone)
aminophenols
N-N-diethyl p-phenylenediamine
3-methyl-N,N-diethyl-p-phenylenediamine
N,N,N',N'-tetramethyl-p-phenylenediamine
4-hydroxymethyl-4-methyl-1-phenyl-3-pyrazolidinone
4,4-bis(hydroxymethyl)-1-phenyl-3-pyrazolidinone, etc.

In using dye releaser compounds in my invention, the production of diffusible dye images is a function of development of the silver halide emulsions with a silver halide developing agent to form either negative or direct-positive silver images in the emulsion layers. If the silver halide emulsion employed forms a direct-positive silver image, such as a direct-positive internal-image emulsion or a solarizing emulsion, which is developable in unexposed areas, a positive image can be obtained on the dye image-receiving layer when dye releasers are employed which release dye where oxidized. After exposure of the film unit, the alkaline processing composition permeates the various layers to initiate development in the exposed photosensitive silver halide emulsion layers. The developing agent present in the film unit develops each of the silver halide emulsion emulsions are direct-positive ones), thus causing the developing agent to become oxidized imagewise corresponding to the unexposed areas of the direct-positive silver halide emulsion layers. The oxidized developing agent then crossoxidizes the dye-releaser compound, the oxidized form of which undergoes a base-catalyzed reaction to release the preformed dyes or the dye precursors imagewise as a function of the imagewise exposure of each of the silver halide emulsion layers. At least a portion of the imagewise distributions of diffusible dyes or dye precursors diffuse to the image-receiving layer to form a positive image of the original subject.

Internal-image silver halide emulsions useful in the above-described embodiment are direct-positive emulsions that form latent images predominantly inside the silver halide grains, as distinguished from silver halide grains that form latent images predominantly on the surface thereof. Such internal-image emulsions were described by Davey et al in U.S. Pat. No. 2,592,250 issued Apr. 8, 1952, and elsewhere in the literature. Other useful emulsions are described in U.S. Pat. Nos. 3,761,276; 3,761,226, 3,761,267 and 3,703,584, the disclosure of which are hereby incorporated by reference. Internal-image silver halide emulsions can be defined in terms of the increased maximum density obtained when developed to a negative silver image with "internal-type" developers over that obtained when developed with "surface-type" developers. Suitable internal-image emulsions are those which, when measured according to normal photographic techniques by coating a test portion of the silver halide emulsion on a transparent support, exposing to a light-intensity scale having a fixed time between 0.01 and 1 second, and developing for 3 minutes at 20° C. in Developer A below (internal-type developer) have a maximum density at least five times the maximum density obtained when an equally exposed silver halide emulsion is developed for 4 minutes at 20° C. in Developer B described below (surface-type developer). Preferably, the maximum density in Developer A is at least 0.5 density unit greater than the maximum density in Developer B.

| | |
|---|---|
| DEVELOPER A | |
| Hydroquinone | 15 g |
| Monomethyl-p-aminophenol sulfate | 15 g |
| Sodium sulfite (desiccated) | 50 g |
| Potassium bromide | 10 g |
| Sodium hydroxide | 25 g |
| Sodium thiosulfate | 20 g |
| Water to make one liter | |
| DEVELOPER B | |
| P-hydroxyphenylglycine | 10 g |
| Sodium carbonate | 100 g |
| Water to make one liter | |

The internal-image silver halide emulsions when processed in the presence of fogging or nucleating agents provide direct positive silver images. Such emulsions are particularly useful in the above-described embodiment. Suitable fogging agents include the hydrazines disclosed in Ives U.S. Pat. No. 2,588,982 issued Mar. 11, 1952 and 2,563,785 issued Aug. 7, 1951; the hydrazides and hydrazones disclosed in Whitmore U.S. Pat. No. 3,227,552 issued Jan. 4, 1966; hydrazone quaternary salts described in British Pat. No. 1,283,835; and U.S. Pat. No. 3,615,615; hydrazone containing polymethine dyes described in U.S. Pat. No. 3,718,470; and the acylhydrazinophenylthioureas disclosed in copending applications Ser. No. 601,891 and 601,888 of Leone et al filed Aug. 6, 1975; or mixtures thereof, the disclosures of which are hereby incorporated by reference. The quantity of fogging agent employed can be widely varied depending upon the results desired. Generally, the concentration of fogging agent is from about 0.4 to about 8 g per mole of silver in the photosensitive layer, when the fogging agent is in the emulsion layer, or from about 0.1 to about 2 grams per liter of developer if the fogging agent is located in the developer. The fogging agents described in U.S. Pat. No. 3,615,615 and 3,718,470, however, are preferably used in concentrations of 50 to 400 mg per mole of silver in the photosensitive layer.

In other embodiments, the direct-positive emulsions can be emulsions which have been fogged either chemically or by radiation on the surface of the silver halide grains to provide for development to maximum density without exposure. Upon exposure, the exposed areas do not develop, thus providing for image discrimination and a positive image. Silver halide emulsions of this type are very well known in the art and are disclosed, for example in U.S. Pat. Nos. 3,367,778 by Berriman issued Feb. 6, 1968; and 3,501,305, 3,501,306 and 3,501,307 by Illingsworth, all issued Mar. 17, 1970.

In still other embodiments, the direct-positive emulsions can be of the type described in Mees and James The Theory of the Photographic Process, published by MacMillan Co., New York, N.Y., 1966, pp. 149–167.

The various silver handle halide emulsion layers of a color film assembly of the invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layer for absorbing or filtering blue radiation that may be transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

While the alkaline processing composition used in this invention can be applied to the assemblage by the use of rupturable containers of the type disclosed in U.S. Pat. Nos. 2,543,181, 2,643,886, 2,6453,732, 2,723,051, 3,056,492, 3,056,491 and 3,152,515, other means for discharging the composition within the assemblage could also be used, e.g., interjecting the compositions with communicating members similar to hypodermic syringes which are attached either to a camera or camera cartridge.

In a color photographic assemblage according to this invention, each silver halide emulsion layer containing a dye image-providing material or having the dye image-providing material present in a contiguous layer may be separated from the other silver halide emulsion layers in the negative portion of the film unit by materials including gelatin, calcium alginate, or any of those disclosed in U.S. Pat. No. 3,384,483, polymeric materials such as polyvinylamides as disclosed in U.S. Pat. No. 3,421,892, or any of those disclosed in French Pat. No. 2,028,236 or U.S. Pat. Nos. 2,992,104; 3,043,692; 3,044,873; 3,061,428; 3,069,263; 3,069,264; 3,121,011 and 3,427,158.

Generally speaking, except where noted otherwise, the silver halide emulsion layers in the invention comprise photo-sensitive silver halide dispersed in gelatin and are about 0.6 to 6 microns in thickness; the dye image-providing materials are dispersed in an aqueous alkaline solution-permeable polymeric binder, such as gelatin, as a separate layer about 1 to 7 microns in thickness; and the alkaline solution-permeable polymeric interlayers, e.g., gelatin, are about 0.5 to 5 microns in thickness. Of course, these thicknesses are approximate only and can be modified according to the product desired.

The alkaline solution-permeable, light-reflective layer employed in certain embodiments of photographic assemblages of my invention can generally comprise any opacifier dispersed in a binder as long as it has the desired properties. Particularly desirable are white light-reflective layers since they would be esthetically pleasing backgrounds on which to view a transferred dye image and would also possess the optical properties desired for reflection of incident radiation. Suitable opacifying agents include titanium dioxide, barium sulfate, zinc oxide, barium stearate, silver flake, silicates, alumina, zirconium oxide, zirconium acetyl acetate, sodium zirconium sulfate, kaolin, mica, or mixtures thereof in widely varying amounts depending upon the degree of opacity desired. The opacifying agents may be dispersed in any binder such as an alkaline solution-permeable polymeric matrix, such as, for example, gelatin, polyvinyl alcohol, and the like. Brightening agents such as the stilbenes, coumarins, triazines and oxazoles can also be added to the light-reflective layer, if desired. When it is desired to increase the opacifying capacity of the light-reflective layers, dark-colored opacifying agents, e.g., pH-indicator dyes, may be added to it, or carbon black, nigrosine dyes, etc., may be coated in separate layer adjacent to the light-reflective layer.

A neutralizing layer employed in certain embodiments of my invention will usually increase the stability of the transferred image. Generally, the layer will effect a reduction in the pH of the image layers from about 13 or 14 to at least 11 and preferably 4–8 within a short time after imbibition. For example, polymeric acids as disclosed in U.S. Pat. No. 3,362,819 or solid acids or matallic salts, e.g., zinc acetage, zinc sulfate, magnesium acetate, etc, as disclosed in U.S. Pat. No. 2,584,030 may be employed with good results. Such neutralizing or pH-lowering materials reduce the pH of the film unit after the development to terminate development and substantially reduce further dye transfer and thus stabilize the dye image.

An inert timing or spacer layer can be employed in certain embodiments of my invention over the neutralizing layer which "times" or controls the pH-reduction as a function of the rate at which alkali diffuses throughout the inert spacer layer. Examples of such timing layers include any of those disclosed in U.S. Pat. Nos. 3,455,686; 3,421,893; 3,419,389; 3,433,633; 3,575,701; 3,785,815; and 3,856,522. The timing layer may also be effective in evening out the various reaction rates over a wide range of temperatures, e.g., premature pH reduction is prevented when imbibition is effected at temperatures above room temperature, for example, at 35° to 40° C. The timing layer is usually about 0.2 to about 14 μm in thickness. Good results are obtained when the timing layer comprises a hydrolyzable polymer or a mixture of such polymers which are slowly hydrolyzed by the processing composition. Examples of such hydrolyzable polymers include polyvinyl acetate, polyamides, cellulose esters, etc. Especially good results are obtained with mixtures of cellulose acetate and maleic anhydride copolymers as described and claimed in copending U.S. Pat. application Ser. No. 521,221 of Abel filed Nov. 5, 1974.

Any material can be employed as the image-receiving layer in this invention as long as the desired function of mordanting or otherwise fixing the dye images will be obtained. The particular material chosen will, of course, depend upon the dye to be mordanted. If acid dyes are to be mordanted, the image-receiving layer can contain basic polymeric mordants such as polymers of amino guanidine derivatives of vinyl methyl ketone such as described by Minsk, U.S. Pat. No. 2,882,156 issued Apr. 14, 1959, and basic polymeric mordants such as described in U.S. Pat. Nos. 3,788,855, 3,758,445, 3,488,706, 3,639,357, 3,557,066, 3,709,690, 3,625,694, 3,898,088 and 3,859,096. Other mordants useful in my invention include poly-4-vinylpyridine, the 2-vinyl pyridine polymer metho-p-toluene sulfonate and similar compounds described by Spraque et al, U.S. Pat. No. 2,484,430 issued Oct. 11, 1949, and cetyl trimethylammonium bromide, etc. Effective mordanting compositions are also described in U.S. Pat. Nos. 3,271,148 by Whitmore and 3,271,147 by Bush, both issued Sept. 6, 1966, and U.S. Pat. No. 525,248 by Campbell et al filed Nov. 19, 1974.

Other materials useful in the dye image-receiving layer include alkaline solution-permeable polymeric layers such as N-methoxymethyl polyhexylmethylene adipamide; partially hydrolyzed polyvinyl acetate; and other materials of a similar nature. Generally, good results are obtained when the image-receiving layer, preferably alkaline solution-permeable, is transparent and about 1 to about 5 μm in thickness. This thickness, of course, can be modified depending upon the result desired. The image-receiving layer can also contain ultraviolet absorbing materials to protect the mordanted dye images from fading due to ultraviolet light, brightening agents such as the stilbenes, coumarins, triazines, oxazoles, dye stabilizers such as the chromanols, alkylphenols, etc.

The alkaline processing composition employed in this invention contains the alkali metal salt described previously and the conventional aqueous solution of an alkaline material, e.g., sodium hydroxide, sodium carbonate or an amine such as diethylamine, possessing a pH of at least about 11, and preferably containing a developing agent as described previously. The solution also preferably contains a viscosity-increasing compound such as a high-molecular-weight polymer, e.g., water-soluble ether inert to alkaline solutions such as hydroxyethyl cellulose or alkali metal salts of carboxymethyl cellulose such as sodium carboxymethyl cellulose. A concentration of viscosity-increasing compound of about 1 to about 5% by weight of the processing composition is preferred which will impart thereto a viscosity of about 100 cps. to about 200,000 cps. In certain embodiments of my invention, an opacifying agent, e.g., $TiO_2$, carbon black, indicator dyes, etc., may be added to the processing composition. In addition, ballasted indicator dyes and dye precursors may also be present in the photographic assemblage as a separate layer on the exposure side of the photosensitive layers, the indicator dyes being preferably transparent during exposure and becoming colored or opaque after contact with alkali from the processing composition.

The supports for the photographic elements of this invention can be any material as long as it does not deleteriously effect the photographic properties of the film unit and is dimensionally stable. Typical flexible sheet materials include cellulose nitrate film, cellulose acetate film, poly(vinyl acetal) film, polystyrene film, poly(ethylene terephthalate) film, polycarbonate film, poly-α-olefins such as polyethylene and polypropylene film, and related films or resinous materials. The support is usually about 2 to 9 mils in thickness. Ultraviolet absorbing materials may also be included in the supports or as a separate layer on the supports if desired.

The silver halide emulsions useful in my invention are well known to those skilled in the art and are described in Product Licensing Index, Vol. 92, December, 1971, publication 9232, p. 107, paragraph I, "Emulsion types"; they may be chemically and spectrally sensitized as described on p. 107, paragraph III, "chemical sensitization", and pp. 108–109, paragraph XV, "Spectral sensitization", of the above article; they can be protected against the production of fog and can be stabilized against loss of sensitivity during keeping by employing the materials described on p. 107, paragraph V, "Antifoggants and stabilizers", of the above article; they can contain development modifiers, hardeners, and coating aids as described on pp. 107–108, paragraph IV, "Development modifiers"; paragraph VII, "Hardeners"; and paragraph XII, "Coating aids", of the above article; they and other layers in the photographic elements used in this invention can contain plasticizers, vehicles and filter dyes described on p. 108, paragraph XI, "Plasticizers and lubricants", and paragraph VIII, "Vehicles", and p. 109, paragraph XVI, "Absorbing and filter dyes", of the above article; they and other layers in the photographic elements used in this invention may contain addenda which are incorporated by using the procedures described on p. 109, paragraph XVII, "Methods of addition", of the above article; and they can be coated by using the various techniques described on p. 109, paragraph XVIII, "Coating procedures", of the above article, the disclosures of which are hereby incorporated by reference.

The following examples further illustrate the invention.

EXAMPLE 1

An integral multicolor photosensitive element was prepared by coating the following layers in the order recited on a transparent poly(ethylene terephthalate) film support (coverages in g/m$^2$) unless specified otherwise):

1. image-receiving layer of copoly[styrene-Co-N-vinylbenzyl-N,N,N-trihexylammonium chloride] (2.2) and gelatin (2.2);
2. reflecting layer of titanium dioxide (22) and gelatin (2.2);
3. opaque layer of carbon black (2.7) and gelatin (1.7);
4. cyan dye image-providing compound (0.54) having the formula

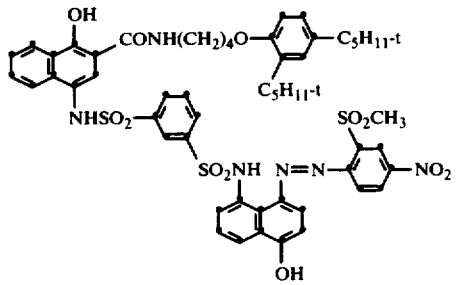

dissolved in diethyl lauramide (0.27) and gelatin (0.73);

5. red-sensitive, internal-image gelatin-silver chlorobromide emulsion (1.1 g gelatin/m$^2$ and 1.1 g silver/m$^2$), 2-sec-octa-decylhydroquinone-5-sulfonic acid (8 g/mole) silver and nucleating agent 1-acetyl-2-[p-[5-amino-2-(2,4-di-t-pentylphenoxy)benzamido]phenyl]hydrazine (1.5 g/mole of silver);
6. interlayer of gelatin (0.55) and 2,5-di-sec-dodecylhydroquinone (1.1);
7. magenta dye image-providing compound (0.65) having the following formula

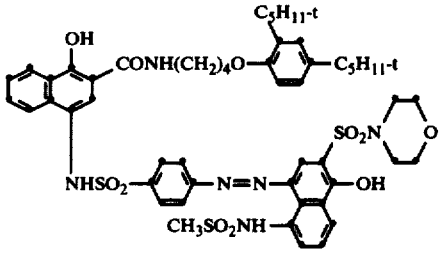

dissolved in diethyl lauramide (0.33) and gelatin (1.1);

8. green-sensitive, internal-image gelatin-silver chlorobromide emulsion (1.2 g. gelatin/m$^2$ and 1.1 g silver/m$^2$), 2-sec-octadecylhydroquinone-5-sulfonic acid (16 g/mole silver) and nucleating agent 1-acetyl-2-[p-[5-amino-2-(2,4di-t-pentylphenoxy)-benzamido]phenyl]hydrazine (1.5 g mole silver);
9. interlayer of gelatin (0.55) and 2,5-di-sec-dodecylhydroquinone (1.1);
10. yellow dye image-providing compound (1.1) having the formula

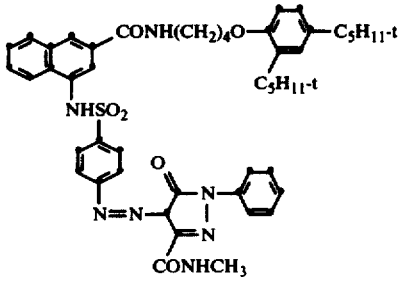

dissolved in diethyl lauramide (0.33) and gelatin (1.1);

11. blue-sensitive internal-image gelatin-silver chlorobromide emulsion (1.1 g gelatin/m$^2$ and 1.1 g silver/m$^2$), 2-sec-octadecyl hydroquinone-5-sulfonic acid (8 g/mole silver) and nucleating agent 1-acetyl-2[p-[5-amino-2-(2,4-di-t-pentylphenoxy)benzamido]phenyl]hydrazine (1.5 g/mole silver; and
12. overcoat of gelatin (0.54).

The above silver halide emulsions are direct-positive emulsions having high internal sensitivity and low surface sensitivity of the type described in U.S. Pat. No. 3,761,276. The cyan and yellow dye image-providing compounds are described in the U.S. Published Pat. application B-351,673 referred to above. The magenta dye image-providing compound is described in U.S. Pat. No. 3,932,380 referred to above.

The above-prepared photosensitive element was then exposed to a graduated-density multicolor test object. Separate samples were then processed with a portion of one of the two processing compositions identified below which was contained in a pod and spread between the integral transfer element and a cover sheet by passing the elements between a pair of juxtaposed pressure rollers. The cover sheet comprises a transparent poly(ethylene terephthalate) film support coated with a polyacrylic acid neutralizing layer and a cellulose acetate timing layer.

PROCESSING COMPOSITION

| PROCESSING COMPOSITION | | |
|---|---|---|
| Components | Pod A (Control) | Pod B |
| Potassium hydroxide | 56 g | 56 g |
| 4-Methyl-4-hydroxymethyl-1-phenyl-3-pyrazolidone | 8.0 g | 8.0 g |
| 5-Methylbenzotriazole | 2.4 g | 2.4 g |
| t-Butylhydroquinone | 0.2 g | 0.2 g |
| Sodium sulfite | 2.0 g | 2.0 g |
| Potassium fluoride | none | 6.0 g |
| Carbon | 200 g | 200 g |
| Carboxymethyl cellulose | 51 g | 51 g |
| Distilled water to | 1000 ml | 1000 ml |

In both samples, well-defined multicolor reproductions of the test object were produced. In the sample processed with the control Pod A, however, from 10–19 "specks"/cm$^2$ were observed on the viewing side of the assemblage. In the sample processed with the processing composition of the invention in Pod B, no specks at all were visually observable.

EXAMPLE 2

Additional exposed samples of the integral multicolor photographic element described in Example 1 were processed in a similar manner except that a portion of one of the two processing compositions identified below was employed in the pod.

PROCESSING COMPOSITION

| PROCESSING COMPOSITION | | |
|---|---|---|
| Components | Pod C (Control) | Pod D |
| Potassium hydroxide | 56 g | 61 g |
| 4-Methyl-4-hydroxymethyl-1-phenyl-3-pyrazolidone | 8 g | 8 g |
| 5-Methylbenzotriazole | 2.4 g | 2.4 g |
| t-Butylhydroquinone | 0.2 g | 0.2 g |
| Sodium sulfite | 2.0 g | 2.0 g |
| Carbon | 100 g | 100 g |
| Carboxymethylcellulose | 51 g | 51 g |
| Oxalic acid | None | 4.5 g |
| Distilled water to | 1000 ml | 1000 ml |

In both samples, well-defined multicolor reproductions of the test object were produced. Observations similar to those of Example 1 were made, i.e., a multitude of specks were visually apparent on the viewing side of the sample processed with Pod C, whereas no specks were observed in the sample processed with Pod D.

The invention has been described in detail with particular reference to certain preferred embodiments thereof, but it will be understood that variations and modifications can be effected within the spirit and scope of the invention.

I claim:

1. In a photographic assemblage comprising:

a. a support having thereon at least one photosensitive silver halide emulsion layer having associated therewith a dye image-providing material;

b. a dye image-receiving layer; and c. an alkaline processing composition having a pH of at least about 11 and means for discharging same within said assemblage;

said assemblage containing a silver halide developing agent; the improvement wherein said alkaline composition contains a salt which is an alkali metal fluoride [or an alkali metal oxalate].

2. The assemblage of claim 1 wherein:

a. said dye image-receiving layer is located between said support and said silver halide emulsion layer; and b. said assemblage also includes a transparent cover sheet over the layer outermost from said support.

3. The assemblage of claim 2 wherein said cover sheet is coated with, in sequence, a neutralizing layer and a timing layer.

4. The assemblage of claim 3 wherein said discharging means is a rupturable container containing said alkaline processing composition and an opacifying agent, said container being so positioned during processing of said assemblage that a compressive force applied to said container will effect a discharge of the container's contents between said transparent sheet and the layer outermost from said support.

5. The assemblage of claim 1 wherein said salt is present in said processing composition at a concentration of from about 0.01 N to about 0.5 N.

6. The assemblage of claim 1 wherein said salt is potassium floride.

[7. The assemblage of claim 1 wherein said salt is potassium oxalate.]

8. an integral photographic assemblage comprising:

a. a photosensitive element comprising a transparent support having thereon the following layers in sequence; a dye image-receiving layer, an alkaline solution-permeable, light-reflective layer, an alkaline solution-permeable, opaque layer, a red-sensitive silver halide emulsion layer having a ballasted cyan dye releaser associated therewith, a green-sensitive silver halide emulsion layer having a ballasted magenta dye releaser associated therewith, and a blue-sensitive silver halide emulsion layer having a ballasted yellow dye releaser associated therewith;

b. a transparent sheet superposed over said blue-sensitive silver halide emulsion layer and comprising a transparent support coated with, in sequence, a neutralizing layer and a timing layer; and c. a rupturable container containing an alkaline processing composition, an opacifying agent, and a salt which is an alkali metal fluoride [or an alkali metal oxalate], said composition having a pH of at least about 11, said container being so positioned during processing of said assemblage that a compressive force applied to said container will effect a discharge of the container's contents between said transparent sheet and said blue-sensitive silver halide emulsion layer;

said assemblage containing a silver halide developing agent.

9. The assemblage of claim 8 wherein each said dye releaser is a ballasted sulfonamido compound which is alkali-cleavable upon oxidation to release a diffusible color-providing moiety from the benzene nucleus, said compound having the formula:

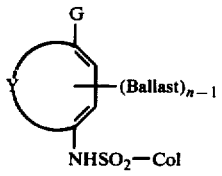

wherein:

a. Col is a dye or dye precursor moiety;

b. Ballast is an organic ballasting radical of such molecular size and configuration as to render said compound nondiffusible in said photosensitive element during development in an alkaline processing composition at a pH of at least about 11;

c. G is OR or $NHR_1$ wherein R is hydrogen or a hydrolyzable moiety and $R_1$ is hydrogen or an alkyl group of 1 to 22 carbon atoms;

d. Y represents the atoms necessary to complete a benzene nucleus, a naphthalene nucleus, or a 5–7 membered heterocyclic ring; and e. n is a positive integer of 1 to 2 and is 2 when G is OR or when $R_1$ is hydrogen or an alkyl group of less than 8 carbon atoms.

10. The assemblage of claim 9 wherein each said silver halide emulsion is an internal-image silver halide emulsion.

11. The assemblage of claim 1 wherein said support having thereon said photosensitive silver halide emulsion layer is opaque and said dye image-receiving layer is located on a separate transparent support superposed over the layer outermost from said opaque support.

12. The assemblage of claim 11 wherein said transparent support is coated with, in sequence, a neutralizing layer, a timing layer, and said dye image-receiving layer.

13. In a process for producing a photographic transfer image in color from an imagewise-exposed photosensitive element comprising a support having thereon at least one photosensitive silver halide emulsion layer having associated therewith a dye image-providing material; said process comprising treating said photosensitive element with an alkaline processing composition in the presence of a silver halide developing agent to effect development of each of said exposed silver halide emulsion layers, said alkaline composition having a pH of at least about 11, whereby an imagewise distribution of dye image-providing material is formed as a function of development and at least a portion of it diffuses to a dye image-receiving layer to provide said transfer image, the improvement comprising including in said alkaline processing composition a salt which is an alkali metal fluoride [or an alkali metal oxalate].

14. The process of claim 3 wherein said salt is potassium fluoride.

[15. The process of claim 13 wherein said salt is potassium oxalate]

16. The process of claim 13 wherein said salt is present in said processing composition at a concentration of from about 0.01 N to about 0.5 N.

* * * * *